Dec. 10, 1957   N. H. CURTISS ET AL   2,815,638
WRAPPING OR UNWRAPPING APPARATUS
Filed Oct. 15, 1953   4 Sheets-Sheet 1
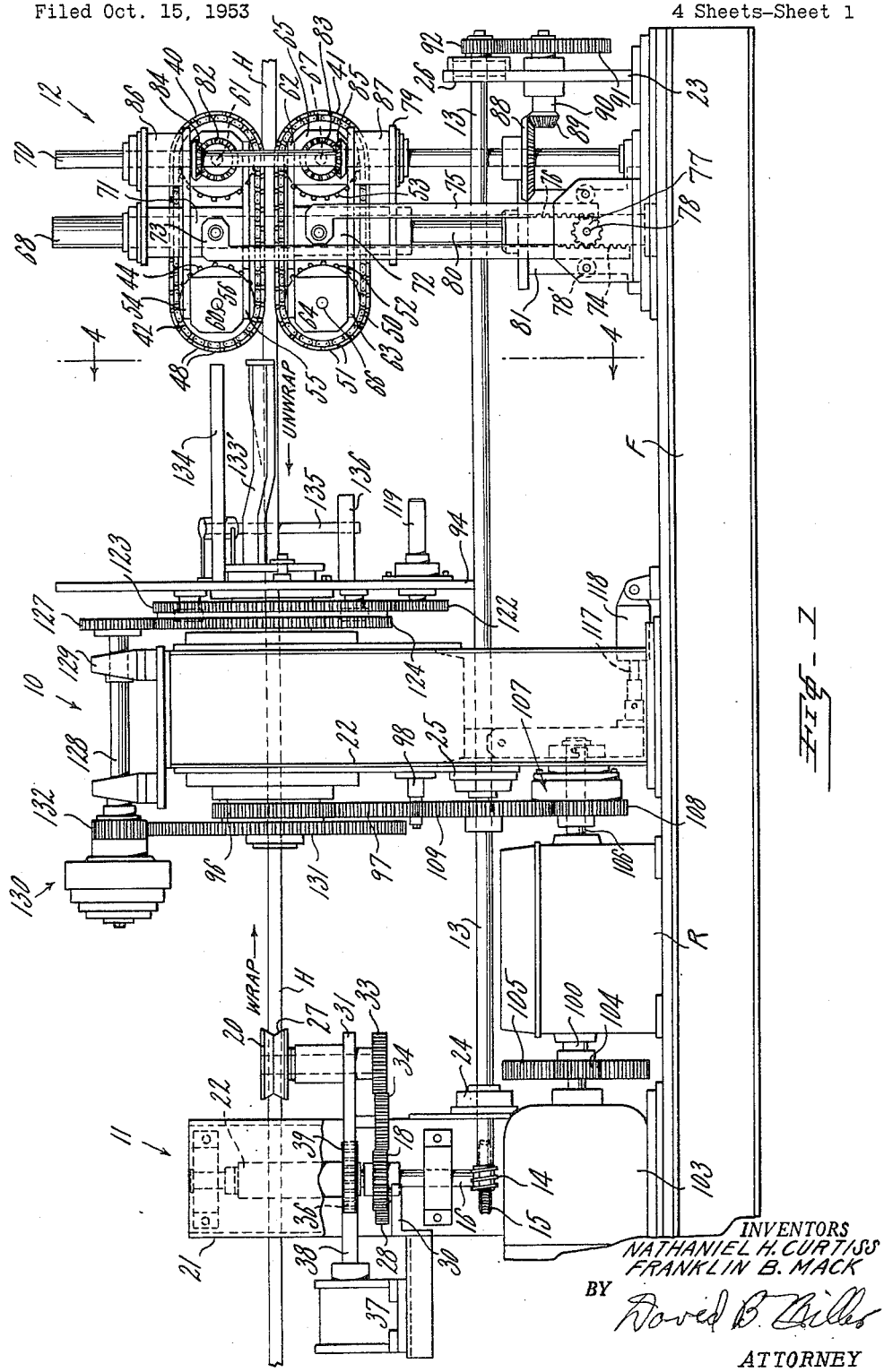
Fig-1
INVENTORS
NATHANIEL H. CURTISS
FRANKLIN B. MACK
BY 
ATTORNEY

United States Patent Office 2,815,638
Patented Dec. 10, 1957

2,815,638

WRAPPING OR UNWRAPPING APPARATUS

Nathaniel H. Curtiss and Franklin B. Mack, Clifton, N. J., assignors to United States Rubber Company, New York, N. Y., a corporation of New Jersey Application October 15, 1953, Serial No. 386,344

10 Claims. (Cl. 57—1)

This invention relates to wrapping or unwrapping apparatus, and in particular it relates to an apparatus for applying a narrow strip such as a tape to, and removing such a tape from, an elongated member such as a mandrel in a helical winding which encloses the mandrel within a casing of the tape.

In the rubber industry articles such as hoses are commonly formed by extruding rubber or similar material about an elongated cylindrical rod as a core to form lengths of the uncured hose on the mandrel. Before these mandrels containing the extruded stock are inserted in a vulcanizer to cure the hose thereon, the hose is commonly wrapped tightly on the mandrel by winding a strip of tape, such as cloth or the like, of a width in the order of 1 or 2 inches about the stock on the mandrel in an overlapping helical winding to completely enclose the uncured stock within a jacket of this tape.

After the hose has been cured, the tape wrapping is removed so that the hose may be removed from the mandrel. Various apparatus have been proposed heretofore to perform the operations of winding and unwinding these narrow tapes on a mandrel. But these apparatus have generally proved unsatisfactory, particularly for unwinding the tape from the mandrel, so that prior to this invention it has been common practice in commercial operations to remove these tapes manually from the mandrel by supporting the mandrel on a plurality of rollers and by grasping a loose end of the tape to pull it from the mandrel while the latter rotates on its supporting rollers.

This method of removing these tapes from such mandrels is generally unsatisfactory because the workman as he removes the tape, gathers it in bunches. Consequently these tapes, which are reused many times, must be rewound after each use into a neat roll before it can be reapplied to a new mandrel in an economical manner. Furthermore, this manual tape removal operation requires the use of many workmen to unwrap the many lengths of hose which are produced each day in a modern factory.

It is an object of this invention to provide apparatus for unwinding strips, such as the tapes heretofore described, from helical windings about elongated objects, such as the windings on hose mandrels of the type heretofore described, which will remove these tapes rapidly and efficiently. It is a further object of this invention to provide an unwrapping means of the type heretofore described which will wind the tape as it is removed from the mandrel in a neat package in a condition to be reused immediately to wrap further mandrels without the necessity for rewinding the tape. A further object of this invention is to provide apparatus of the type described which may be used either to wind or unwind a tape on a mandrel in a helical winding. Other and further objects of this invention will be apparent from the following detailed description thereof and will be pointed out more fully hereinafter.

In accordance with this invention a rotatable wrapping and unwrapping head is provided having an axial opening therethrough through which a mandrel may be advanced longitudinally along the axis of rotation of the head. This rotatable wrapping head carries tape receiving means thereon which are rotated planetarily by the wrapping head about a mandrel as it passes axially through the wrapping head. The wrapping head is constructed so that a tape may be led between the mandrel and the tape receiving means in a manner to remove the tape from or to apply it to the mandrel in a helical winding. The means whereby the tape is led from the mandrel to the tape receiving means for the unwrapping operation is constructed and arranged such that the tape is led to the tape receiving means in a manner to be wound in a neat package thereon.

Means are provided in conjunction with the wrapping head to advance the mandrel longitudinally through the center of the wrapping head as the wrapping head rotates. Additional means are provided to coordinate the speed of the mandrel advancing means with the rotational speed of the wrapping head so that a helical wrapping of any given pitch angle may be applied to or removed from a mandrel. Since the helical winding is applied to the mandrel with a constant pitch angle, it will be appreciated that the speed of rotation of the wrapping head must bear a constant relationship to the speed of advance of the mandrel through the wrapping head. Furthermore since each revolution of the wrapping head will remove a constant linear dimension of the tape from such a helical winding having a constant pitch angle, means must be provided which will receive this constant linear dimension of tape from the mandrel. However, since it is desired to wrap this tape neatly in the form of a roll on a spool or the like, it will be appreciated that as this roll grows in diameter, each revolution of the spool will take up a progressively increasing linear dimension of tape. Accordingly, a novel and highly efficient means are provided to drive the tape receiving means which will rotate this tape receiving means at a progressively lesser rotational speed as the tape roll grows thereon, which rotational speed is coordinated with and controlled by the length of tape which is removed from the mandrel. In this manner the tape receiving spindle is driven at such a speed that the tape which is removed from the mandrel is wound neatly and tightly thereon in a condition to be reused immediately to wrap further mandrels.

When a helical winding of the type heretofore described is removed from a mandrel by a head which rotates about the mandrel, the tape will tend to assume a position on a winding spindle which coincides with the position which it had on the mandrel, i. e. it will tend to wrap the winding spindle in a helical wrapping. However when such tape is to be reused to wrap additional spindles it is desirable that the tape be wound in a substantially cylindrical package on a spool or the like so that each succeeding winding overlies the other windings already on the spool. In accordance with this invention means are provided for directing the tape from the mandrel to the winding spindle in a manner such that it will be wound on the spindle in a neat cylindrical package.

For a better understanding of the nature of this invention, reference should be had to the following detailed description of one specific embodiment thereof, when read in conjunction with the accompanying drawings, wherein:

Fig. 1 is a side elevational view partly broken away of one embodiment of apparatus according to this invention;

Fig. 5 is a top plan view of the mandrel advancing means at the unwrapping feed end of the embodiment of this invention shown in Fig. 1.

Figure 2:
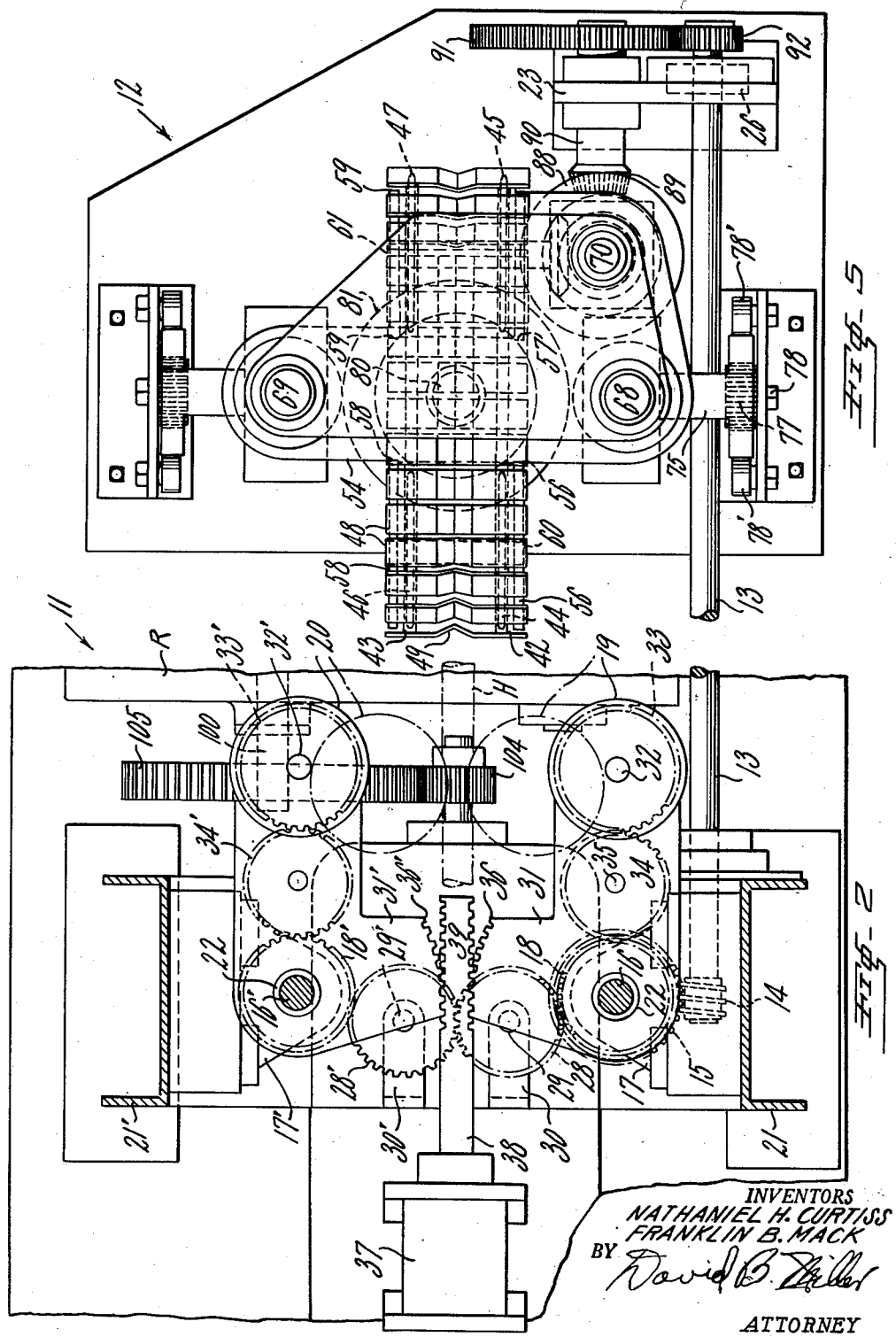
Fig. 2 is a top plan view of the apparatus for advancing a mandrel at the wrapping feed end of the embodiment shown in Fig. 1.

Referring now to the drawings and in particular to Fig. 1 thereof, there is shown an embodiment of this invention in apparatus for wrapping and unwrapping mandrels such as a mandrel carrying an uncured length of rubber hose thereon as heretofore described. This apparatus comprises generally a wrapping head 10 for wrapping a tape of cloth or the like upon, and unwrapping the tape from, a mandrel having a length of hose H thereon. On opposite sides of the wrapping head 10 and supported on a common frame F therewith are disposed a mandrel advancing means 11 at the wrapping feed end of the wrapping head and a mandrel advancing means 12 at the unwrapping feed end of the wrapping head. The mandrel advancing means 11, 12 in the embodiment shown in the drawings together are adapted to grip and to advance a mandrel H through the center of the rotatable wrapping means of the wrapping head 10. The mandrel feed means 11, 12 may be driven to advance the mandrel H from left to right or from right to left, as seen in Fig. 1, through the wrapping head 10 to wrap and unwrap respectively, as indicated by the arrows in Fig. 1, the tape on the mandrel. As will be pointed out more fully hereinafter the rotatable means of the wrapping head carries tape spindles which are rotated planetarily around the hose mandrel H as it advances through the head 10, so the tape from the supply may be wrapped helically about the mandrel H, or may be removed from its helical disposition on this mandrel as the mandrel advances through the head 10.

*Mandrel advancing means*

The mandrel advancing means comprises the heads 11 and 12 situated on opposite sides of the wrapping head. Both of these heads receive their motive power from a common shaft 13 which extends the length of the apparatus and is rotatably supported in a bearing 24 on the upstanding frame beam 21 of the mandrel advancing head 11, and in a bearing 25 on the upstanding frame beam 22 of the wrapping head 10 and in a bearing 26 on the upstanding plate 23 of the mandrel advancing head 12. The shaft 13 may be rotated both clockwise and counterclockwise to adapt the apparatus for both unwrapping and wrapping the mandrel H, and the shaft 13 may be driven at different speeds to advance the mandrel faster or slower, so the tape may be applied to the mandrel in helical wrappings having different pitch angles as will be more fully explained hereinafter.

*Wrapping feed mandrel advancing head*

The mandrel advancing head 11 at the wrapping feed end of the apparatus, as best shown in Figs. 1 and 2, is supported in a pair of upstanding beams 21, 21' on opposite sides of the path of mandrel travel through the apparatus. Each of the beams 21, 21' carries one of the vertical shafts 16, 16' which are rotatably mounted on the beams 21, 21' by straps 17, 17' respectively. The shafts 16, 16', through gearing about to be described, rotate the mandrel advancing rollers 19, 20. Each of these rollers 19, 20 is mounted on the level of a mandrel opening through the wrapping head 10, and each has a pulley-like, V-shaped indentation 27 between its ends to better grip and align the mandrel H for movement through the wrapping head. As shown in Fig. 2, the rollers 19, 20 are movable horizontally towards each other to the dot-dash position shown in which they grip the mandrel H on opposites sides thereof to advance this mandrel through the wrapping head 10.

The shafts 16, 16' are rotated from the shaft 13 by means of a worm 14 fixed to shaft 13 which meshes with a worm gear 15 fixed to the shaft 16. Intermediate its length shaft 16 has fixed thereto a gear 18 which meshes with an idler gear 28 mounted on a stud shaft 29 in a support 30 on the frame of the apparatus. The idler gear 28 meshes with a second idler gear 28' mounted on a similar stud shaft 29' in a support 30'. The idler gear 28' in turn meshes with a gear 18' fixed to the shaft 16' on the other side from shaft 16 of the path of mandrel travel through the apparatus. Each of these shafts 16, 16', above the gears 18, 18', carries a sleeve such as that shown at 22 rotatably journaled thereon which sleeves in turn have the generally L-shaped plates 31, 31' fixed thereon. These plates 31, 31' have journaled therein the shafts 32, 32' respectively on which are mounted the rollers 19 and 20 respectively. At the lower end of the shaft 32, 32' and at the level of the gears 18, 18', the shafts 32, 32' carry gears 33, 33' respectively fixed thereto. Intermediate the gears 33 and 18 and meshing therewith, an idler gear 34 is mounted on a stud shaft 35 on the L-shaped plate 31. A similar idler gear 34' is similarly mounted on the plate 31' intermediate the gears 18' and 33'.

It will therefore be seen that motive power is transmitted from the shaft 13 through the worm 14, worm gear 15, shaft 16, gear 18, idler 34, gear 33, and shaft 32 to rotate the roller 19. Similarly motive power will be transmitted from the shaft 13 through worm 14, worm gear 15, shaft 16, gear 18, idler gears 28 and 28', gear 18', idler gear 34', gear 33' and shaft 32' to rotate the roller 20. It will be noted further that idler gears 28, 28' change the direction of rotation transmitted to roller 20 so that rollers 19 and 20 rotate in opposite directions to advance the mandrel H when it is gripped between them. The gears 18, 18', 28, 28', 34, 34', and 33, 33' are selected of such a size as to rotate the rollers 19, 20 at substantially identical peripheral speeds.

Referring now to Fig. 2, the L-shaped plates 31, 31', are provided with the gear segments 36, 36' respectively on the end of that leg of the L which extends centrally toward the path of mandrel travel through the apparatus. An air cylinder 37 carries a rod 38 having the double rack 39 thereon between the plates 31, 31' and meshing with the gear segments 36, 36'. Therefore if the air cylinder 37 be actuated to move the rod 38 to the right as seen in Fig. 2, the plate 31' will be rotated counterclockwise by the gear segment 36' and rack 39, and the plate 31 will be rotated clockwise by the gear segment 36 and rack 39, to separate the rollers 19 and 20 which are carried by the other legs of the L-shaped members that extend toward the wrapping head. Similarly if the air cylinder 37 be actuated to move the rod 38 in the reverse direction, the plates 31, 31' will be rotated to move the rollers 19 and 20 toward each other to grip the mandrel H at its sides firmly between them. It will also be noted that by means of the air cylinder 37, the rollers 19, 20 can be made to grip mandrels of various diameters with a substantially constant pressure so that the rollers 19, 20 may be maintained in predetermined frictional engagement with mandrels of various sizes; and that by varying the pressure on the cylinder 37 the rollers 19, 20 may be made to grip a mandrel more or less firmly to advance it through the wrapping head without slippage between the surfaces of the rollers 19, 20 and the mandrel as may be desirable for mandrels of different sizes.

*Unwrapping feed mandrel advancing means*

The unwrapping feed mandrel advancing means 12, disposed on the side of the wrapping head 10 opposite the mandrel advancing means 11, is best shown in Figs. 1 and 5. In the embodiment there shown, this means comprises an upper caterpillar-like track 40 and a lower caterpillar-like track 41 which, as shown in Fig. 1, are adapted to grasp the mandrel H between them and to advance this mandrel through the opening in the wrapping head 10 as these tracks 40, 41 are rotated.

The upper caterpillar-like track 40 comprises a pair of laterally spaced chains 42, 43. The chain 42 runs on an inner sprocket 44 at that end of the advancing head 12 adjacent the wrapping head 10, and also on an aligned outer sprocket 45 spaced from the sprocket 44 in a direction away from the wrapping head 10. The chain 43 runs on the similarly spaced sprockets 46, 47. A plurality of flat plates 48 fixed near their ends to the spaced chains 42, 43 bridge the distance between these chains. As best shown in Fig. 5, each of these plates has a generally V-shaped indentation 49 disposed centrally thereof, so the group of plates between the inner sprockets 44, 46 and the outer sprockets 45, 47 form a centrally disposed V-shaped trough extending along the path of mandrel advance in which trough the mandrel is gripped during operation of the apparatus. The lower caterpillar-like track 41 is formed similarly of laterally spaced chains, one of which is shown at 50, which carry a plurality of plates 51 having similar V-shaped indentations centrally thereof. This track 41 is similarly carried on four spaced sprockets, two of which are shown at 52 and 53.

The upper caterpillar-like track is mounted on a vertically movable carriage which in the embodiment shown in the drawings consists of two vertically spaced somewhat H-shaped plates 54, 55. The forward legs of the H-shaped plates 54, 55 have axle plates 56, 58, each extending between a leg of the H-shaped plate 54 and a corresponding leg of the H-shaped plate 55. The rearward legs of the H-shaped plates 54, 55 have disposed therebetween two similar axle plates 57, 59. Rotatably mounted in the forward axle plates 56, 58 is an axle 60 which carries the inner sprockets 44, 46. Rotatably mounted in the outer axle plates 57, 59 is an axle 61 which carries the sprockets 45, 47.

The lower caterpillar-like track 41 is mounted similarly on a vertically moveable carriage formed of two vertically spaced somewhat H-shaped plates 62, 63, having axle plates such as those shown at 64 and 65 mounted therebetween to carry the axles 66 and 67 for the sprockets 52 and 53.

The caterpillar-like tracks 40, 41 are mounted on a pair of vertically extending rods 68, 69 which project through holes in the generally H-shaped plates 54, 55 and 62, 63. These plates have further aligned holes therethrough to receive a drive shaft 70 to be described. As best shown in Fig. 1, the upper caterpillar-like track 40 is mounted for vertical sliding movement on the shafts 68, 69 by means of a sleeve 71 fixed between the plates 54, 55 which sleeve is slidable on the shaft 68. A similar sleeve similarly mounts the upper caterpillar-like track on the shaft 69. A second sleeve 72 slidably mounted on the shaft 68 is fixed between the somewhat H-shaped plates 62, 63 and mounts the lower caterpillar-like track 41 on the shaft 68 for vertical sliding movement thereon. A similar sleeve is similarly mounted on the shaft 69 between the plates 62, 63. There is fixed to the sleeve 71 a downwardly extending member 73 which carries a rack 74 on its lower end. There is similarly fixed to the sleeve 72 a downwardly extending member 75 which carries at its lower end a rack 76. Near the lower ends of the members 73 and 75, there is an idler pinion 77 mounted on a rotatable stud shaft 78. Both of the racks 74 and 76 are held in mesh with the idler pinion 78 by backing rollers 78'. The lower caterpillar-like track 41 has fixed to its supporting structure a plate 79 through which the caterpillar-like track 41 is supported and is positioned vertically. Fixed to the lower side of this plate 79, is a plunger 80 of a pneumatic cylinder 81. The pneumatic cylinder 81 can be actuated to raise or lower the plunger 80, and consequently to raise or lower the lower caterpillar-like track 41. From what has been described heretofore it will be apparent that when the lower caterpillar-like track 41 is moved vertically, it will carry with it the depending member 75 which has thereon the rack 76 in mesh with the pinion 78. Therefore the pinion 78 will be rotated as the lower caterpillar-like track 41 is raised or lowered, and since the rack on the member 73 meshes with this pinion 78, the upper caterpillar-like track 40 to which the member 73 is fixed will be moved a distance vertically which corresponds to the distance through which the caterpillar-like track 41 is moved. However, because of the disposition of the rack 74 on the opposite side of the pinion 78 from the rack 76, the upper caterpillar-like track 40 will be moved in an opposite direction to that of the lower caterpillar-like track 41.

It will therefore be apparent that the tracks 40, 41 can be aligned so that they may grip a mandrel such as the hose mandrel heretofore described for movement through the opening in the wrapping head. Once the position of these tracks has been adjusted to move a mandrel of any given diameter through the center of the opening in the wrapping head, these tracks will grip mandrels for advance through this center regardless of the size of the mandrels because for any given position of the tracks each of the caterpillar-like tracks 40, 41 will be displaced the same distance from a horizontal plane which is located centrally between them. It will be apparent further that when the apparatus shown is threaded with a mandrel, the caterpillar-like tracks 40, 41 can be separated by lowering the lower caterpillar-like track 41 by means of the air cylinder 81. This in turn through the pinion 78 will raise the upper caterpillar-like track 40. After a mandrel is threaded between these tracks in their V-shaped troughs, the cylinder 81 can be actuated to raise the lower caterpillar-like track 41, and consequently to lower the upper caterpillar-like track 40 until the mandrel is gripped between these tracks. This mandrel will be gripped with a constant pressure as determined by the pressure in the air cylinder 81, and the mandrel will be advanced through the wrapping head by these tracks as they are rotated on their sprockets.

To drive the caterpillar-like tracks 40, 41 in the apparatus shown in the drawings, the shafts 61, 67 have fixed thereto bevel gears 82 and 83 respectively. Bevel gear 84 journalled in the support for the upper caterpillar-like track 40 meshes with the bevel gear 82, and a similar bevel gear 85 journalled in the support for the lower caterpillar-like track 41 meshes with the bevel gear 83. Bevel gears 84 and 85 are rotatably carried in supports 86 and 87 respectively which are mounted on the supports for the upper and lower caterpillar-like tracks respectively. These supports 86 and 87 have journalled therein sleeves which are mounted for sliding movement on the upstanding rotatable stud shaft 70, but are keyed to this shaft 70 for rotation therewith. These sleeves have fixed thereto gears 84 and 85. This shaft 70 carries at its lower end a bevel gear 88 fixed thereto which meshes with a bevel gear 89 mounted on a shaft 90 rotatably supported in the upstanding plate 23 fixed to the frame F of the apparatus. The shaft 90 has fixed thereto on its other end a gear 91 which meshes with a gear 92 fixed to the end of the drive shaft 13 for the mandrel advancing means.

It will therefore be evident that as the shaft 13 is rotated power will be transmitted through the gears 92, 91, shaft 90, gear 89, and gear 88 to the shaft 70. From the shaft 70, power will be transmitted through the sliding sleeve in support 87, keyed to shaft 70, gear 85, gear 83 and shaft 67 to drive the sprockets supporting the lower caterpillar-like track 41. Similarly power will be transmitted from the shaft 70 to the sleeve in support 86, gear 84, gear 82 and shaft 61 to drive the sprockets supporting the upper caterpillar-like track 40. However, it will be noted that while gear 84 is above its meshing gear 83, gear 85 is below its meshing gear so that the caterpillar-like tracks 40 and 41 will be driven in opposite directions about their sprockets. Therefore, the reaches of the caterpillar-like tracks 40, 41 which are adjacent each other and which grip the mandrel will be advanced in the same direction to move the mandrel through the wrapping head in a direction determined by the direction of rotation of shaft 13.

Wrapping head

Figure 3:
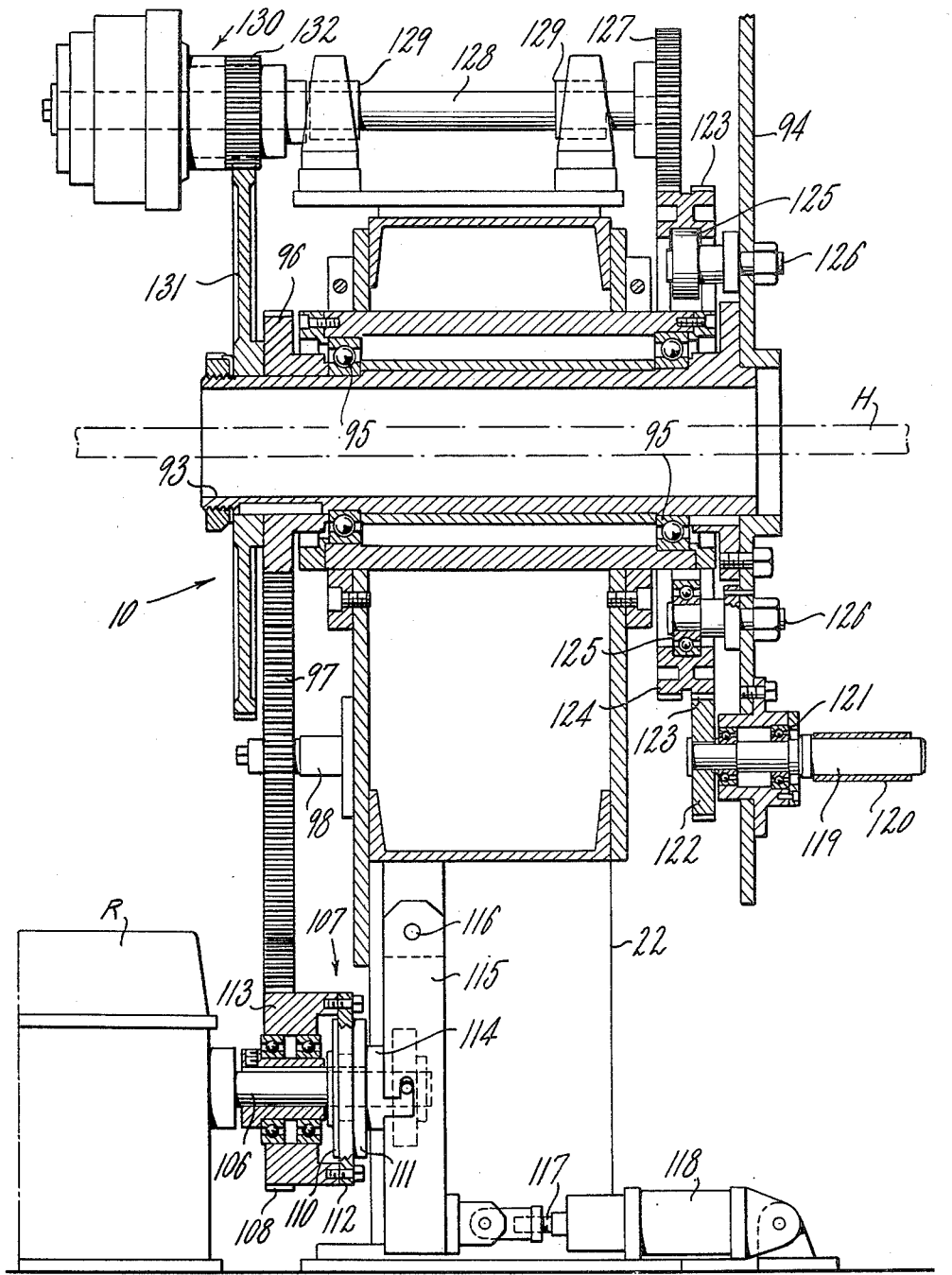
Fig. 3 is a vertical cross-sectional view of the wrapping head of the embodiment of this invention shown in Fig. 1.
Figure 4:
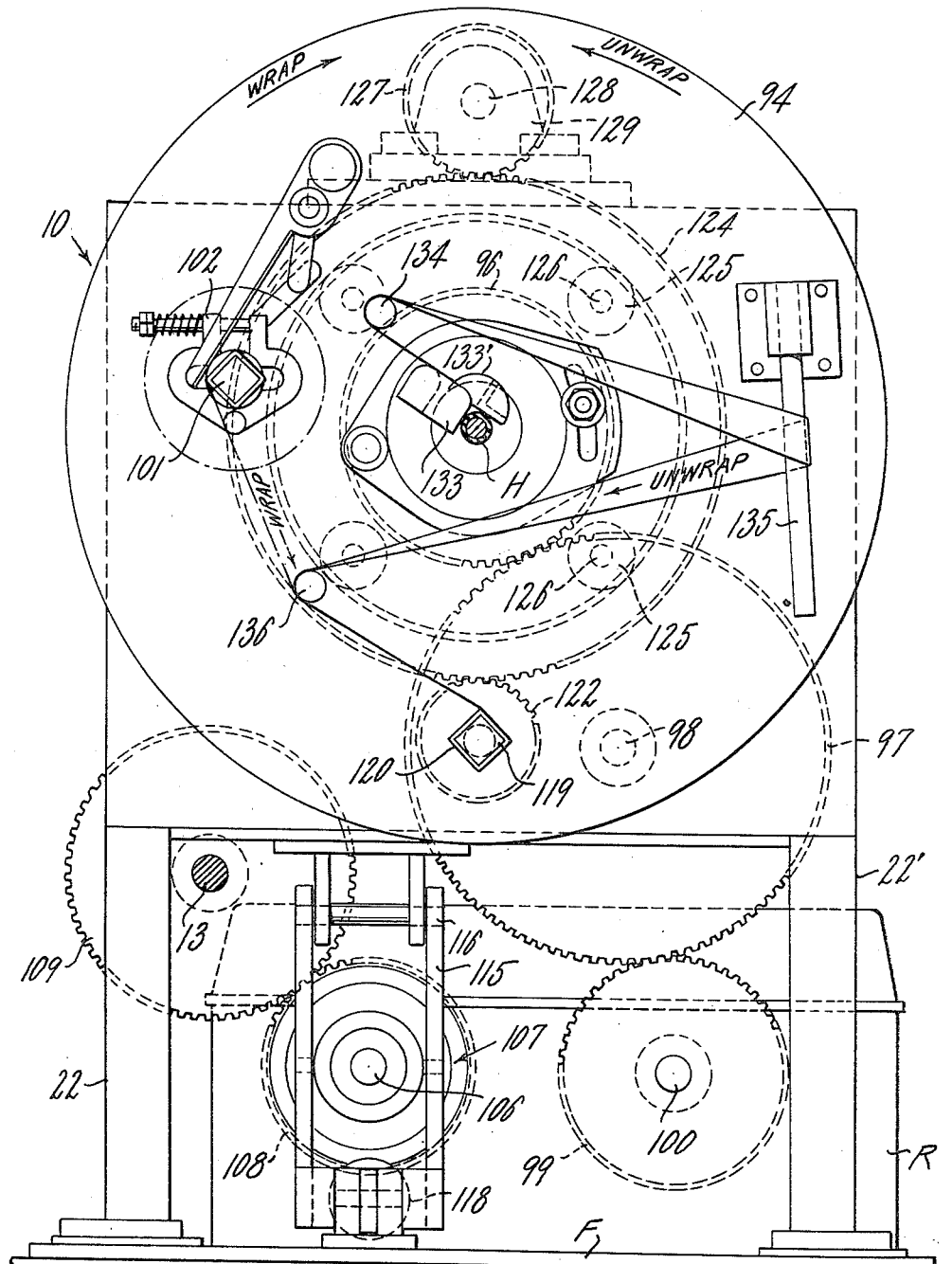
Fig. 4 is an end elevational view of the wrapping head looking in the direction of mandrel travel during the unwrapping operation along the line 4—4 of the embodiment of this invention shown in Fig. 1.

The wrapping head of the embodiment of this invention shown in the drawings is best illustrated in Figs. 1, 3 and 4. Referring first to Fig. 3, this wrapping head comprises a hollow cylindrical tube 93 through the center of which a mandrel, such as the mandrel H carrying a length of rubber hose as heretofore described, is designed to pass when the device is being used to wrap upon, or unwrap a tape from, the mandrel. This hollow tube 93 has fixed thereto at the unwrapping feed mandrel advancing means side thereof a circular plate 94 which has an opening therethrough in alignment with the opening through the cylindrical tube 93. The tube 93 and plate 94 are supported for rotation in the upstanding frame members 22, 22' of the machine by means of anti-friction bearings 95. The cylindrical tube 93 has fixed thereon a gear 96, which as best shown in Fig. 4, meshes with an idler gear 97 fixed to a stud shaft 98 on the frame of the machine. The idler gear 97 in turn meshes with a driving gear 99 fixed to one output shaft 100 of a Reeves variable speed drive R.

The plate 94 carries a wrapping tape stud shaft or spindle 101 spaced from the opening through plate 94 which is adapted to carry a spool of tape such as the cloth tape heretofore generally used to wrap lengths of rubber hose when these lengths are vulcanized on a mandrel. This stud shaft 101 is freely rotatable on the plate 94, but carries a friction brake such as the brake 102 which tends to retard rotation of the shaft 101 as the tape is pulled from the spool on the stud shaft 101, so the tape is maintained taut on this spool and under tension as it is wrapped on the mandrel. Since this tape supply is supported on the rotating plate 94, it will be apparent that if a free end of the tape from this supply is fixed to the mandrel, then when the mandrel H is advanced through the hollow tube 93 while this tube is rotating the tape will be applied to the mandrel in a helical winding.

Means are provided for rotating the hollow tube 93 hence the plate 94 simultaneously with the advance of the mandrel H through the hollow tube 93. This means consists of a reversible motor 103 having a pinion 104 (see Figs. 1 and 2) fixed to its drive shaft. Pinion 104 meshes with gear 105 fixed to shaft 100 of the variable speed drive R. Since the gear 99 is fixed to the opposite end of this input shaft 100 of the drive R, it will be apparent that the plate 94 will be rotated by the motor 103 at a speed and in a direction determined by the drive of the motor.

The variable speed output shaft 106 of the drive R drives the shaft 13 through a clutch 107, gear 108, and a gear 109 fixed to shaft 13. The clutch 107 provides means for disengaging the drive to the mandrel advancing means so that the head 93, 94 may be rotated without advancing the mandrel therethrough, for it may be desirable to rotate this head while the mandrel is stationary, particularly when the tape is being threaded up on the mandrel when a new mandrel is supplied to the machine.

The clutch 107 may be any suitable clutch. In the embodiments shown, this clutch consists of a backing plate 110 (see Fig. 3) fixed to the shaft 106. A friction plate 111 is keyed to the shaft 106 for rotation therewith and for sliding movement longitudinally thereof. Disposed between the plates 110 and 111 is a disk 112 which as shown is bolted to the ring 113 that is supported on the shaft 106 by means of anti-friction bearings. Ring 113 carries fixed thereto gear 108 which drives the shaft 13. A push plate 114 bears against plate 111, which push plate is supported in the movable straps 115 that are pivoted at one end by the bolt 116 to the frame of the machine. The other ends of the straps 115 are fixed to a plunger 117 of a pneumatic cylinder 118. It will be apparent that if the pneumatic cylinder 118 is actuated to move its plunger 117 to the left as viewed in Fig. 3, push plate 114 will press against plate 111 so the disk 112 is held between the plates 110 and 111 in driving relationship to the shaft 106. Therefore when the cylinder 118 is actuated in this manner, power will e transmitted from the shaft 106 through the clutch 107 to the shaft 13, but if plunger 118 is released, ring 112 will slip between plates 110 and 111. In this manner the shaft 13 can be actuated to drive the mandrel advancing means 11 and 12 as desired independently of the drive to the warpping head 10. Furthermore, since the shaft 13 is driven from the variable speed shaft of the variable speed drive R, the rate of mandrel advance may be varied independently of the rate of rotation of the wrapping head to vary the pitch angle of the helically wound tape on the mandrel H or to accommodate the device for unwinding tape from mandrels when the tapes on different mandrels have different pitch angles.

Unwrapping take-up control

Referring next to Figs. 3 and 4, the rotating disk 94 of the wrapping head carries a stud shaft or spindle 119 which is adapted to have wound therearound the tape that is removed from a mandrel advancing through the apparatus. If it be considered that a mandrel having a helically disposed winding of tape thereabouts is advanced from right to left through the cylinder 93 as seen in Fig. 3, it will be apparent that two problems immediately present themselves if the tape removed from the mandrel is to be wound neatly on a sleeve such as that shown at 120 on the shaft 119. Firstly if the mandrel is advancing through the tube 93 at a constant speed and if the pitch angle of the tape on the mandrel is constant, each revolution of the plate 94, consequently of the shaft 119, about the mandrel will remove a constant linear footage of the tape. However if the tape is to be wound neatly on the sleeve 120 so that it may be used without rewinding the tape, it will be apparent that the effective diameter of the sleeve 120 will increase with each wrap of tape which is wound thereabouts. This means that the shaft 119 must be rotated on its axis at progressively slower speeds as the body of tape is built up thereon if a neat, tight tape package is to be produced. In the apparatus according to this invention, means, about to be described, are provided for rotating this shaft 119 at all times at a speed which will accept the tape from the mandrel regardless of the amount of tape already on the sleeve 120 to build a neat, tight package thereon.

Secondly it will be appreciated that from the nature of the helical winding on the mandrel the tape as it is unwound from the mandrel will be disposed at an angle to the axis of the mandrel. If this tape were led directly to the sleeve 120 which is disposed so that its axis is parallel to that of the mandrel, the tape as it was led on to the sleeve 120 would be disposed at an angle to the axis of this sleeve 120. This means that rather than having each succeeding layer of tape wound on the sleeve 120 immediately over the next preceding layer of tape, the tape would tend to wind helically on the sleeve 120 to wrap the tape thereon in the same manner that the wrapping was disposed on the mandrel. In the apparatus according to this invention, means about to be described, are provided for winding the tape on the sleeve 120 in a manner such that each succeeding wrapping of the tape on the sleeve 120 will lie over the next preceding wrapping to provide a neat spiral winding on the sleeve 120.

To drive the shaft 119 at the proper speed to take up the tape from the mandrel at the desired rate, the shaft 119 is rotatably mounted in the plate 94 by means of anti-friction bearing 121. The shaft 119 carries on its other end a pinion 122 fixed thereto. This pinion 122 is in mesh with a set of teeth 123 of a planetary gear 124 having two sets of teeth. The planetary gear is supported on a plurality of freely rotatable rollers 125 that are supported on shafts 126 fixed to the plate 94; hence gear 124 is rotatable independently of the wrapping head. A gear 127 meshes with the other set of teeth on the planetary gear 124. This gear 127 is fixed to a shaft 128 which is supported in bearings 129 on the framework of the wrapping head. There is fixed to the other end of the shaft 128 a friction slip clutch 130 the output of which is supplied to the shaft 128. A gear 131 is fixed to the rotatable tube 93 and meshes with a gear 132 on the input of the slip clutch 130. The slip clutch may be of any suitable type, and a slip clutch of the type wherein two friction plates are pressed together by means of a coil spring is satisfactory. It will be apparent from the foregoing that as the tube 93 is rotated, the gear 131 through the slip clutch 130 and planetary gear 124 tends to drive the shaft 119 to take up the tape on the mandrel. The arrangement is such that the shaft 119 will tend to be overdriven and to take up more tape than is unwrapped from the mandrel. Since the slip clutch 130 is interposed in the drive train to the shaft 119, the power transmitted through this clutch will be only that which is necessary to drive the shaft 119 at the peripheral speed which is necessary to take up the tape that is unwrapped from the mandrel. Furthermore, the friction clutch 130 will tend to drive the shaft 119 at such a speed that the tape is maintained under tension as it is wound on the sleeve 120, so that a tight package will be built up on this sleeve. It will be noted further that because of the drive train employed in the embodiments shown, i. e. the take-up spindle driven from the planetary gear 124 while the input to the planetary gear 124 is taken from the output shaft of the slip clutch 130, the amount of slippage required in the slip clutch, hence the power consumed in the slip clutch and the size of the slip clutch, is maintained small. Thus in one practical embodiment of this invention, it has been found that by connecting the output of a slip clutch to a planetary gear in the manner shown, the rotational speed of the shaft 119 may vary from 80 to 900 R. P. M. during one winding operation while the rotational speed of the output shaft 128 of the slip clutch is varying only between 1200 and 1800 R. P. M. Thus by a decrease in speed of approximately one-third of the output shaft of the slip clutch, it has been possible to obtain a decrease of approximately 100% in the rotational speed of the take-up spindle 119.

Referring next to Figs. 1 and 4, there is shown means for guiding the tape from the mandrel to the take-up sleeve 120 so that this tape will be wound on the sleeve 120 in a substantially annular package rather than a helical wrapping. There is fixed to the plate 94 a right angular channel member 133' which projects outwardly from the plate a substantial distance as shown. This right angular member 133' provides a channel in which the mandrel H is supported against bending by the force exerted on the wrapping tape as it is pulled from the mandrel. As best shown in Fig. 4, the tape T is led over an outwardly projecting leg 133 of this channel 133' at the base of the channel, and thence over an elongated pin 134 which projects outwardly a substantial distance from the face of the plate 94 in the direction and parallel to the axis of the mandrel H. From the pin 134, the tape T is led through a quarter turn about a second elongated pin 135 on the opposite side of the opening through the plate 94 for the mandrel H. As shown, this pin 135 has its axis disposed at right angles to the direction of the axis of pin 134, the mandrel H, and parallel to the surface of the plate 94. From the pin 135 the tape T is led through another quarter turn about a third pin 136 disposed on the opposite side of the opening through the plate 94 from the pin 135. As shown in Fig. 1, the pin 136 may be substantially shorter than the pins 134 and 135 if desired. From the pin 136 the tape is led to the sleeve 120 on the take-up spindle 119. If Figs. 1 and 4 of the drawing are referred to, it will be apparent that as the tape T is led from the mandrel H and over the rod 134, it may assume a position on the rod 134 longitudinally of the rod which will best accommodate the take-off from the mandrel of the tape for the particular pitch angle of the tape on the mandrel. However, because of the angular disposition of the rod 135 with respect to the rod 134, it will be apparent that regardless of the disposition of the tape on the rod 134 longitudinally thereof, the tape will be led about the rod 135 in a fixed position laterally of the pin 135 as shown in Fig. 1 although it may assume various positions longitudinally of this pin. Similarly the tape as it leaves the rod 135 will be directed to the rod 136 in a fixed plane longitudinally of rod 136 regardless of the position of the tape longitudinally on the rod 135. In this manner, the tape T is always led about the rod 136 in a fixed position longitudinally of the rod 136 which position is determined by the spacing of the rod 135 from the surface of the plate 94. Since the tape T is led about the rod 136 in a fixed position longitudinally thereof, it will be wound on the sleeve 120 on the spindle 119 in a fixed position longitudinally of the spindle 119 because the axis of this spindle is parallel to the axis of the rod 136. Consequently the tape will be wound on the sleeve 120 in a neat package so that it may be transferred to a winding spindle to wrap an unwound mandrel without rewinding the tape package.

*Operation*

It is believed the operation of the device will be apparent from the foregoing. To wrap a mandrel such as a mandrel containing a length of uncured rubber hose with a tape of fabric or the like prior to vulcanizing the hose, the mandrel H is inserted through the wrapping feed mandrel advancing means 11 and through the cylindrical tube 93 and plate 94 to rest in the channel 133'. A sleeve of tape is disposed on the spindle 101 and the tape therefrom may conveniently be led over the pins 136, 135, 134 and under the channel 133' and threaded about the uncured hose on the mandrel H as heretofore described. Thereafter, with the clutch 107 open so that the mandrel is not advanced through the wrapping head 10, the wrapping head may be rotated to place a few anchoring wraps on the mandrel H. Cylinder 37 has been actuated to close the rollers 19, 20 to grip the mandrel H between them. Clutch 107 is then closed to drive the shaft 13 to advance the mandrel H through the wrapping head from left to right as seen in Fig. 1. As the plate 94 rotates and the mandrel H advances the tape will be wound on the mandrel helically to enclose the uncured rubber therewithin. When the end of the mandrel has advanced to a position between the tracks 40, 41, the cylinder 81 is actuated to close these tracks about the mandrel so that they may assist the rollers 19, 20 to advance the mandrel through the wrapping head. The operation is continued until the mandrel H has advanced completely through the wrapping head and the hose is completely wrapped in the tape. If desired, near the end of the mandrel the clutch 107 may be disengaged while the plate 94 continues to rotate, to wrap a few binding turns of the tape on the mandrel. Thereafter, the mandrel is ready to be placed in the vulcanizer.

To unwrap a tape from a mandrel containing the cured rubber hose, a mandrel H is led between the tracks, 40, 41 and supported in the channel 133'. The cylinder 81 is actuated to close the tracks 40, 41 on the mandrel as heretofore described. The tape T is unwound from the mandrel H sufficiently so that a length may be led under the projection 133, over the pin 134 through a quarter turn and over the pin 135, through another quarter turn and over the pin 136 and then about the sleeve 120 on the take-up spindle 119. If a few binding wrappings remain on the spindle H, the motor 103 may be actuated in a direction to advance the mandrel H through the wrapping head 10 from right to left as viewed in Fig. 1, but with the clutch 107 deactuated. When the motor 103 is thus actuated, the tube 93 and plate 94 will rotate in a direction to remove the wrappings from the mandrel H. However, since the clutch 107 is not actuated, the mandrel H will not advance through the wrapping head. When the binding wrappings have been removed from the mandrel H, the clutch 107 is actuated to commence the advance of the mandrel H through the plate 94 so that the helical windings will be unwrapped from the mandrel H. In this respect it will be noted that the pin 134 is of substantial length in its projection from the plate 94. This provides some leeway for the actuation of the clutch 107 because some of the helical wrappings may actually be removed before this clutch is actuated yet the pin 134 is of sufficient length that the unwrapping does not proceed beyond the end thereof. With the clutch 107 operative, the mandrel H will be advanced through the wrapping head 10 to unwrap the tape from the mandrel H and to wrap this tape in a neat package on the spindle 119. When the mandrel has advanced sufficiently through the wrapping head 10, the cylinder 37 may be actuated so the rollers 19, 20 grip the mandrel H to assist the tracks 40, 41 in advancing the mandrel through the wrapping head 10. The operation continues until the mandrel H has been advanced through the wrapping head 10 and until all of the helical windings of the tape T have been unwound from the mandrel H.

Having thus described our invention, what we claim and desire to protect by Letters Patent is:

1. In apparatus for winding strips on and unwinding strips from an elongated member, the combination which comprises a rotatable head, gripping means for gripping said elongated member, pneumatic means yieldingly urging said gripping means into gripping position, means for driving said gripping means to advance said elongated member through said head, strip carrying means on said rotatable head, and means for coordinating the rotational speed of said head with said driving means.

2. In apparatus for winding strips on and unwinding strips from an elongated member, the combination which comprises a rotatable head, vertically movable gripping means for gripping said elongated member positionable above and below said elongated member, pneumatic means yieldingly urging said gripping means into gripping position, positioning means for said vertically movable gripping means adapted to move said vertically positionable means towards opposite sides of said elongated member simultaneously, means for driving said gripping means to advance said elongated member through said head, strip carrying means on said rotatable head, and means for coordinating the rotational speed of said head with the driving means for said elongated member.

3. In apparatus for winding strips on and unwinding strips from an elongated member, the combination which comprises a rotatable head, gripping means on one side of said head for gripping said elongated member above and below said elongated member, gripping means on the other side of said head for gripping said elongated member on opposite sides of said elongated member, pneumatic means for each of said gripping means yieldingly urging said gripping means into gripping position, a support carried by said rotatable head to receive said elongated member as it is advanced therethrough and about which said strip may be led, strip carrying means on said rotatable head, means for driving both of said gripping means to advance said elongated member through said head, and means for coordinating the rotational speed of said head with the driving means for said gripping means.

4. In apparatus for winding strips on and unwinding strips from an elongated member, means for advancing an elongated member through a rotatable wrapping head which comprises a pair of caterpillar-like tracks, one of said tracks being positionable above said elongated member and the other of said tracks being positionable below said elongated member, a rack fixed to each of said tracks, a pinion meshing with both of said racks, said racks being disposed on opposite sides of the axis of said pinion, and means for moving one of said caterpillar-like tracks toward and away from the elongated member, whereby said other track will be moved toward and away from said elongated member in coordination with the other track to grip said elongated member in a fixed position vertically.

5. Apparatus in accordance with claim 4 wherein a pair of horizontally movable gripping rollers are positioned on the other side of the head, means for moving said gripping rollers toward said elongated member simultaneously to grip the sides of the elongated member on opposite sides thereof, and means for driving said rollers in conjunction with said tracks.

6. Apparatus in accordance with claim 5 including a support for said elongated member on the rotatable head, said support being rotatable about said member with said head.

7. Apparatus for unwrapping tapes from mandrels, which comprises a rotatable head, a tape receiving shaft carried by said rotatable head, means for rotating said head, means for advancing a mandrel through said head, said tape receiving shaft having its axis substantially parallel to the axis of said mandrel, an elongated pin projecting from said head having its axis disposed substantially parallel to the axis of said mandrel, a second elongated pin on said head having its axis disposed at substantially right angles to the axis of said first pin, a third pin projecting from said head having its axis disposed substantially parallel to the axis of said mandrel whereby the tape may be led from said mandrel about said first pin thence through a quarter turn about said second pin thence about said third pin to said take-up shaft, and means for driving said take-up shaft coordinated with said head rotating means to receive the tape at substantially the speed that it is removed from said elongated member and to dispose it on said tape receiving means to take-up substantially the same linear length of tape that is removed from said elongated member by each rotation of said head.

8. Apparatus in accordance with claim 7, wherein said rotatable head carries a support projecting therefrom for said elongated member about which said strip is led before it passes through said pins.

9. Apparatus in accordance with claim 8 wherein said rotatable head includes a plate having an axial opening therein through which said elongated member is advanced, and wherein said plate carries said pins and said take-up spindle.

10. A method for unwrapping strips from elongated members which comprises in combination, advancing an elongated member having an elongated strip wrapped thereabout through a rotatable head, rotating said head while said elongated member is advanced therethrough, leading the strip from the elongated member about a first pin projecting from the head substantially parallel to the axis of the elongated member, leading the elongated strip from the first pin to a second pin on said head disposed at substantially right angles to the axis of the first pin and turning the strip a quarter turn about its own axis between the first and second pin, advancing the strip from the second pin to a third pin on said head disposed substantially parallel to the axis of the elongated member and turning the strip a quarter turn about its own axis between said second and third pin, advancing the strip from the third pin to a strip receiving sleeve having its axis disposed substantially parallel to said elongated member, and driving the strip receiving means at a speed coordinated with the head rotating means to take up the strip at substantially the speed that it is removed from he elongated member to wind it on the strip receiving means.

(References on following page)

References Cited in the file of this patent

UNITED STATES PATENTS

| | | |
|---|---|---|
| 747,876 | Fisher | Dec. 22, 1903 |
| 1,220,288 | Subers | Mar. 27, 1917 |
| 2,221,555 | Reynolds | Nov. 12, 1940 |

FOREIGN PATENTS

| | | |
|---|---|---|
| 275,472 | Great Britain | Aug. 11, 1927 |
| 582,583 | Great Britain | Nov. 21, 1946 |
| 698,293 | Germany | Nov. 6, 1940 |